US012709578B2

(12) United States Patent
Nakano et al.

(10) Patent No.: US 12,709,578 B2

(45) Date of Patent: Aug. 18, 2026

(54) ZIRCONIA PRE-SINTERED BODY

(71) Applicant: Kuraray Noritake Dental Inc., Kurashiki (JP)

(72) Inventors: Kirihiro Nakano, Aichi (JP); Nobusuke Kashiki, Aichi (JP); Yasutaka Kudo, Niigata (JP); Yoshihisa Ito, Aichi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 549 days.

(21) Appl. No.: 18/269,300

(22) PCT Filed: Dec. 23, 2021

(86) PCT No.: PCT/JP2021/048065

§ 371 (c)(1), (2) Date: Jun. 23, 2023

(87) PCT Pub. No.: WO2022/138881

PCT Pub. Date: Jun. 30, 2022

(65) Prior Publication Data

US 2024/0067570 A1 Feb. 29, 2024

(30) Foreign Application Priority Data

Dec. 24, 2020 (JP) ................................ 2020-215882

(51) Int. Cl.

*C04B 35/48* (2006.01)
*C04B 35/486* (2006.01)

(Continued)

(52) U.S. Cl.

CPC ...... *C04B 35/486* (2013.01); *C04B 35/62695* (2013.01); *C04B 35/64* (2013.01);

(Continued)

(58) Field of Classification Search

CPC ............. C04B 35/486; C04B 35/62695; C01P 2004/62; C01P 2004/64

See application file for complete search history.

(56) References Cited

U.S. PATENT DOCUMENTS 7,655,586 B1 * 2/2010 Brodkin ............. A61C 13/0006 106/35
8,722,555 B2 * 5/2014 Yamashita .......... C04B 35/6455 501/103

(Continued)

FOREIGN PATENT DOCUMENTS

CN 102701279 A 10/2012
CN 102803180 A * 11/2012 ........... C04B 35/486

(Continued)

OTHER PUBLICATIONS

International Search Report issued Mar. 1, 2022 in PCT/JP2021/048065 (with English translation), 6 pages.

(Continued)

*Primary Examiner* — Noah S Wiese

(74) *Attorney, Agent, or Firm* — Element IP, PLC

(57) ABSTRACT

The present invention provides a pre-sintered body for obtaining a zirconia sintered body that can satisfy both high strength and high translucency, and a method of production of such a pre-sintered body. The present invention relates to a zirconia pre-sintered body comprising a secondary aggregate having an average particle diameter of 275 nm or less, the secondary aggregate comprising zirconia, and a stabilizer capable of preventing a phase transformation of zirconia, the secondary aggregate comprising a larger particle having an average primary particle diameter of 100 nm or more and 200 nm or less, and a smaller particle having an average primary particle diameter of 10 nm or more and less than 60 nm.

13 Claims, 4 Drawing Sheets

(51) Int. Cl.

| | |
|---|---|
| ***C04B 35/626*** | (2006.01) |
| ***C04B 35/64*** | (2006.01) |
| *A61C 5/77* | (2017.01) |
| *A61C 13/00* | (2006.01) |
| *A61C 13/08* | (2006.01) |

(52) U.S. Cl.

CPC ............ *A61C 5/77* (2017.02); *A61C 13/0022* (2013.01); *A61C 13/082* (2013.01); *C04B 2235/3246* (2013.01); *C04B 2235/5445* (2013.01); *C04B 2235/5454* (2013.01); *C04B 2235/608* (2013.01); *C04B 2235/6567* (2013.01); *C04B 2235/785* (2013.01)

(56) References Cited

U.S. PATENT DOCUMENTS

| | | | |
|---|---|---|---|
| 2004/0168610 | A1 | 9/2004 | Conrad et al. |
| 2007/0179041 | A1 | 8/2007 | Muroi et al. |
| 2016/0310245 | A1 | 10/2016 | Fujisaki et al. |
| 2020/0261322 | A1 | 8/2020 | Kim et al. |
| 2020/0317581 | A1 | 10/2020 | Ito |
| 2022/0135486 | A1 | 5/2022 | Kudo et al. |

FOREIGN PATENT DOCUMENTS

| | | | | | |
|---|---|---|---|---|---|
| CN | 105026337 | A | | 11/2015 | |
| DE | 102005061965 | A1 | * | 7/2007 | ............ A61Q 19/00 |
| JP | 2017128471 | A | * | 7/2017 | |
| JP | 2019189524 | A | | 10/2019 | |
| WO | WO-2008061895 | A2 | * | 5/2008 | ........... C09C 1/0009 |
| WO | WO-2018056330 | A1 | | 3/2018 | |
| WO | WO-2020179877 | A1 | | 9/2020 | |

OTHER PUBLICATIONS

M. Moskovits et al, “Sintering of Bimodal Y2O3-Stabilized Zirconia Powder Mixtures With a Nanocrystalline Component”, NanoStructured Materials, vol. 11, No. 2, 1999, pp. 179-185.

Written Opinion issued Mar. 1, 2022 in PCT/JP2021/048065 (with English translation), 10 pages.

Extended European Search Report issued Nov. 27, 2024, in corresponding European Patent Application No. 21911020.2, 8 pages.

* cited by examiner

ZIRCONIA PRE-SINTERED BODY

TECHNICAL FIELD

The present invention relates to a pre-sintered body for obtaining a zirconia (zirconium(IV) oxide; $ZrO_2$) sintered body that satisfies both high strength and high translucency, and to a method of production of such a pre-sintered body.

BACKGROUND ART

Ceramic sintering is generally described as a mass transfer phenomenon in which the free energy of the system decreases. In solid-phase sintering of a ceramic powder, the primary particles contained in the powder undergo grain growth as the surface area or interface decreases with firing time in a manner that depends on the particle diameter and the firing temperature. It is known that grain growth is more likely to take place when particles contained in a powder have smaller diameters, and when the particle size difference before and after the mass transfer is greater.

It is generally understood that ceramic sintered bodies with fewer voids have higher strength, and the strength increases when the particles contained in the sintered bodies are smaller in diameter. It is also commonly acknowledged that ceramic sintered bodies with fewer voids have higher translucency, and the translucency increases when the sintered body contains more particles having a particle size smaller than the wavelengths of visible light.

In order to satisfy both strength and translucency in a ceramic, a sintered body is therefore needed that has higher density with fewer voids, and that maintains small particle size.

As grain growth takes place, the voids between ceramic particles join together, producing voids that become ejected from the sintered body, and voids that remain in the sintered body. Particularly, more voids remain in the sintered body with faster rates of grain growth, and this makes it difficult to obtain a high-density sintered body. Void control is also an issue when the ceramic is polymorphic because a density change occurs with a volumetric increase and decrease due to temperature-dependent phase transformation.

For example, because of the high strength and high toughness of zirconia, a zirconia sintered body (hereinafter, also referred to as "partially-stabilized zirconia sintered body") is used in which a small amount of yttria (yttrium oxide; $Y_2O_3$), or a stabilizer, is dissolved to form a solid solution.

In view of both mechanical characteristics, such as high strength and high toughness, as well as aesthetics, optical properties such as translucency and shade are also required when such a partially-stabilized zirconia sintered body is used as a dental material. Previous studies of partially-stabilized zirconia sintered bodies have investigated zirconia sintered bodies having high density and high strength, and translucency, with the purpose of mimicking natural teeth. Patent Literatures 1 and 2 represent examples.

For example, Patent Literature 1 discloses a translucent partially-stabilized zirconia sintered body comprising more than 4.0 mol % and 6.5 mol % or less of yttria.

Patent Literature 2 discloses a granulated material comprising a larger particle (A) having a median diameter D50 of 0.2 to 12 μm, and a smaller particle (B) having a median diameter D50 of 0.01 to 0.3 μm, and in which the ratio of median diameters (A):(B) is 40:1 at maximum, and the mixing ratio (A):(B) is 0.01:99.9 to 99.9:0.01.

CITATION LIST

Patent Literature

Patent Literature 1: JP 2019-189524 A

Patent Literature 2: US Patent Application Publication Number 2004/168610

DISCLOSURE OF INVENTION

Technical Problem

However, because Patent Literature 1 only uses smaller particles with a primary particle diameter of 32 to 38 nm in a raw material powder to obtain a secondary aggregate having an average particle diameter of 0.4 μm to 0.5 μm, the pre-sintered body cannot increase its density, and the translucency was found to be inadequate. It was also found that a high-density sintered body or a high-strength and high-translucency sintered body cannot be obtained when the median diameter ratio of larger particle (A) and smaller particle (B) is too large as in Patent Literature 2, because the smaller particle (B) immediately becomes absorbed by the larger particle (A) upon firing, and coarse particles derived from larger particle (A) remain before voids are ejected. Another finding is that, when the proportion of smaller particles (B) with a median diameter D50 of less than 0.1 μm is 100 parts by mass to 85 parts by mass in a powder, the smaller particle (B) forms hard aggregates or hard shells during granulation by fusing with larger particle (A) of 0.2 to 12 μm size, and it is not possible to obtain a high-density sintered body or a high-strength and high-translucency sintered body.

It is accordingly an object of the present invention to provide a pre-sintered body for obtaining a zirconia sintered body that can satisfy both high strength and high translucency. Another object of the invention is to provide a method of production of such a pre-sintered body.

Solution to Problem

The present inventors conducted intensive studies to find a solution to the foregoing issues, and found that the above problems can be solved with a zirconia pre-sintered body comprising zirconia, and a stabilizer capable of preventing a phase transformation of zirconia, when the zirconia pre-sintered body contains a secondary aggregate having an average particle diameter of 275 nm or less, and the aggregate comprises particles having an average particle diameter of 100 to 200 nm, and particles having an average particle diameter of 10 to 50 nm. The present invention was completed after further studies based on this finding.

Specifically, the present invention includes the following.

[1] A zirconia pre-sintered body comprising a secondary aggregate having an average particle diameter of 275 nm or less,

- the secondary aggregate comprising zirconia, and a stabilizer capable of preventing a phase transformation of zirconia,
- the secondary aggregate comprising a larger particle having an average primary particle diameter of 100 nm or more and 200 nm or less, and a smaller particle having an average primary particle diameter of 10 nm or more and less than 60 nm.

[2] The zirconia pre-sintered body according to [1], wherein the content of the larger particle in the secondary aggregate is 15 to 85 volume %, and the content of the smaller particle in the secondary aggregate is 15 to 85 volume %.

[3] The zirconia pre-sintered body according to [1] or [2], wherein the stabilizer is yttria.

[4] The zirconia pre-sintered body according to any one of [1] to [3], wherein the content of the stabilizer is 3.0 to 7.5 mol % with respect to the total mole of the zirconia and the stabilizer, and at least a part of the stabilizer is not dissolved in the zirconia as a solid solution.

[5] The zirconia pre-sintered body according to any one of [1] to [4], which has a density of 2.75 g/cm$^3$ or more.

[6] The zirconia pre-sintered body according to any one of [1] to [5], wherein a sintered body after the pre-sintered body is fired at a firing temperature of 1,500° C. or less for 2 hours contains crystal grains with an average crystal grain size of 0.70 μm or less.

[7] The zirconia pre-sintered body according to any one of [1] to [6], wherein a sintered body after the pre-sintered body is fired at a firing temperature of 1,500° C. or less for 2 hours has a density of 5.8 g/cm$^3$ or more.

[8] The zirconia pre-sintered body according to any one of [1] to [7], which has two peaks in a number-based particle size distribution measured with an electron microscope image of the larger particle and the smaller particle, with a first peak representing a most frequent particle diameter occurring at a particle size of 10 nm or more and less than 60 nm, and a second peak occurring at a particle size of 60 nm or more and 200 nm or less.

[9] A method for producing a zirconia pre-sintered body that comprises zirconia, and a stabilizer capable of preventing a phase transformation of zirconia, comprising using a powder (A) that comprises a secondary aggregate comprising a powder (a1) having an average primary particle diameter of 100 nm or more and 200 nm or less, and a powder (a2) having an average primary particle diameter of 10 nm or more and less than 60 nm, the secondary aggregate having an average particle diameter of 275 nm or less, the secondary aggregate comprising zirconia, and a stabilizer capable of preventing a phase transformation of zirconia.

[10] The method for producing a zirconia pre-sintered body according to [9], wherein the powder (A) comprising the secondary aggregate comprises:

15 to 85 mass % of the powder (a1) having an average primary particle diameter of 100 nm or more and 200 nm or less; and 15 to 85 mass % of the powder (a2) having an average primary particle diameter of 10 nm or more and less than 60 nm.

[11] The method for producing a zirconia pre-sintered body according to [9] or [10], wherein the stabilizer is the powder (a1).

[12] The method for producing a zirconia pre-sintered body according to any one of [9] to [11], wherein the content of the stabilizer is 3.0 to 7.5 mol % with respect to the total mole of the zirconia and the stabilizer, and at least a part of the stabilizer is not dissolved in the zirconia as a solid solution.

[13] The method for producing a zirconia pre-sintered body according to any one of [9] to [12], wherein the stabilizer is yttria.

[14] A method for producing a powder for obtaining a zirconia pre-sintered body of any one of [1] to [8], comprising producing a slurry comprising a secondary aggregate that comprises a powder (a1) having an average primary particle diameter of 100 to 275 nm, and a powder (a2) having an average primary particle diameter of 10 nm or more and less than 60 nm, and that has an average particle diameter of 275 nm or less; and granulating the slurry by dry spraying.

[15] A method for producing a zirconia sintered body, comprising firing a zirconia pre-sintered body of any one of [1] to [8].

Advantageous Effects of Invention

A zirconia pre-sintered body of the present invention can be fired to obtain a zirconia sintered body having both high strength and high translucency, suited as a dental material. A zirconia powder and zirconia-containing composition obtained by using a powder production method of present invention have excellent shape retention because chipping (defects) can be reduced in a zirconia molded body obtained by molding.

DESCRIPTION OF EMBODIMENTS

Figure 1:
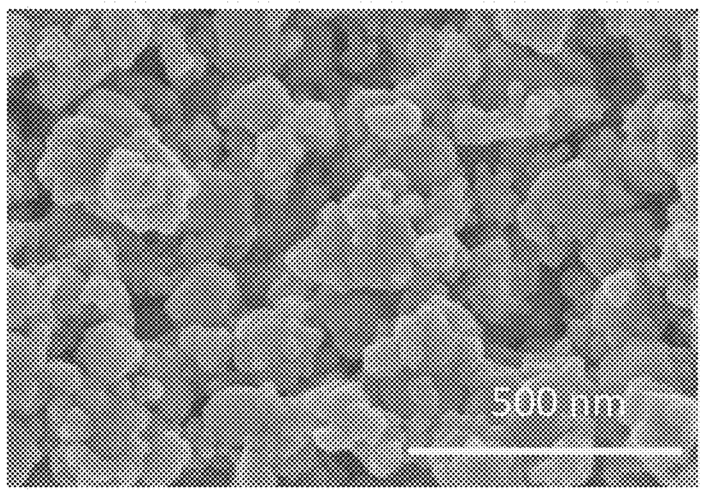
FIG. 1 shows an SEM image of a zirconia pre-sintered body containing secondary aggregates according to Example 1.
Figure 2:
FIG. 2 shows an SEM image of a zirconia powder according to Example 1.
Figure 3:
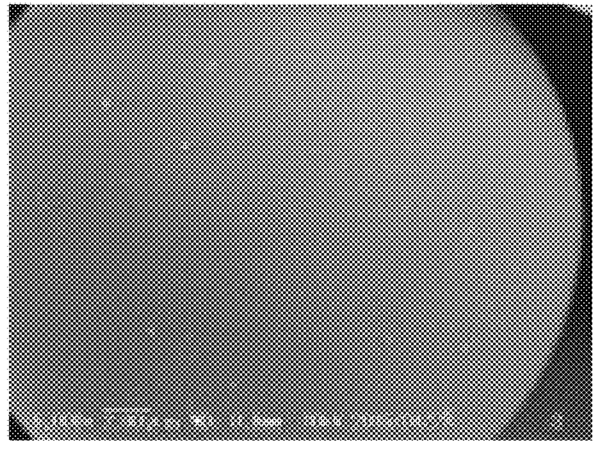
FIG. 3 shows an SEM image of a zirconia powder that has formed a hard shell according to Comparative Example 4.

A zirconia pre-sintered body of the present invention is a pre-sintered body comprising a secondary aggregate having an average particle diameter of 275 nm or less, the secondary aggregate comprising zirconia, and a stabilizer capable of preventing a phase transformation of zirconia (hereinafter, also referred to simply as "stabilizer"), the secondary aggregate comprising a larger particle having an average primary particle diameter of 100 nm or more and 200 nm or less, and a smaller particle having an average primary particle diameter of 10 nm or more and less than 60 nm.

Below is a description of a zirconia pre-sintered body of the present invention. A zirconia pre-sintered body of the present invention can be a precursor (intermediate product) of a zirconia sintered body. In the present invention, a zirconia pre-sintered body refers to a semi-sintered body in which necking of zirconia particles (powder) has occurred, and a block has formed while the zirconia particles were not fully sintered.

A zirconia pre-sintered body of the present invention comprises a secondary aggregate having an average particle diameter of 275 nm or less. The secondary aggregate comprises larger primary particles having an average particle diameter of 100 nm or more and 200 nm or less, and smaller primary particles having an average particle diameter of 10 nm or more and less than 60 nm, and these primary particles come together to form the secondary aggregate.

Because the average primary particle diameter of the larger particles influences the density of a sintered body, the larger particles have an average primary particle diameter of 100 nm or more and 200 nm or less, preferably 104 nm or more and 175 nm or less, more preferably 108 nm or more and 150 nm or less, even more preferably 110 nm or more and 135 nm or less. When the average primary particle diameter of the larger particles is less than 100 nm, it may not be possible to obtain a high-density sintered body due to strong aggregation with the smaller particles. An average primary particle diameter of more than 200 nm may lead to a decrease of translucency after sintering. The average primary particle diameter of the smaller particles influences the average crystal grain size of a sintered body, and, in view of strength or translucency, the smaller particles have an average primary particle diameter of 10 nm or more and less than 60 nm, preferably 15 nm or more and 50 nm or less, more preferably 20 nm or more and 50 nm or less, even more preferably 25 nm or more and 50 nm or less. The strength or translucency may decrease when the average primary particle diameter of the smaller particles is less than 10 nm, whereas the translucency may decrease with an average primary particle diameter of 60 nm or more. In view of the shape retention (shape retainability) of a molded body, and the density, translucency, and strength of a sintered body, the secondary aggregate has an average particle diameter of 275 nm or less, preferably 265 nm or less, more preferably 255 nm or less, even more preferably 245 nm or less. In view of obtaining a high-density pre-sintered body and a high-density sintered body, the preferred form is one in which the smaller particles are adhering around the larger particles. For example, the adhesion of the smaller particles around the larger particles can be visually confirmed in an electron microscope image. In the present invention, an average particle diameter and an average primary particle diameter can be calculated by, for example, analyzing an image captured with an electron microscope. The average primary particle diameters of the secondary aggregate, larger particles, and smaller particles contained in a raw material powder and a molded body obtained by molding a raw material powder, and in a pre-sintered body thereof can be measured using, for example, the methods described in the EXAMPLES section below.

In the present invention, a primary particle refers to a bulk representing the smallest unit, and includes a zirconia particle and a stabilizer particle. Secondary aggregated particles refer to an aggregate formed by a larger particle having an average primary particle diameter of 100 nm or more and 200 nm or less, and a smaller particle having an average primary particle diameter of 10 nm or more and less than 60 nm. The larger particle contains zirconia and/or a stabilizer. The smaller particle contains zirconia and/or a stabilizer. At least one of the larger particle and the smaller particle contain a stabilizer. A certain preferred embodiment is, for example, a zirconia pre-sintered body that comprises secondary aggregated particles in which the larger particles contain zirconia particles and stabilizer particles (preferably, yttria particles), and the smaller particles contain zirconia particles. Another preferred embodiment is, for example, a zirconia pre-sintered body that comprises secondary aggregated particles in which the larger particles contain zirconia particles, and the smaller particles contain zirconia particles and stabilizer particles (preferably, yttria particles).

In view of maintaining a small average crystal grain size in a sintered body to increase its translucency and strength, it is preferable in a zirconia pre-sintered body of the present invention that the content of the larger particles in the secondary aggregate be 15 to 85 volume %, more preferably 18 to 83 volume %, even more preferably 20 to 80 volume %. A zirconia pre-sintered body of the present invention comprises the smaller particles in preferably 15 to 85 volume %, more preferably 17 to 82 volume %, even more preferably 20 to 80 volume %. With the large particles and smaller particles falling in these ranges, the secondary aggregate can have an average particle diameter of 275 nm or less, making it possible to increase the density of the pre-sintered body, and the strength and translucency of the sintered body. In the present invention, the content of the larger particles and smaller particles can be calculated by, for example, analyzing an image captured with an electron microscope.

A zirconia pre-sintered body of the present invention comprises zirconia, and a stabilizer capable of preventing a phase transformation of zirconia. The stabilizer is preferably one capable of forming partially-stabilized zirconia. Examples of the stabilizer include oxides such as calcium oxide (CaO), magnesium oxide (MgO), yttrium oxide ($Y_2O_3$), cerium oxide ($CeO_2$), scandium oxide ($Sc_2O_3$), niobium oxide ($Nb_2O_5$), lanthanum oxide ($La_2O_3$), erbium oxide ($Er_2O_3$), praseodymium oxide ($Pr_6O_{11}$, $Pr_2O_3$), samarium oxide ($Sm_2O_3$), europium oxide ($Eu_2O_3$), and thulium oxide ($Tm_2O_3$). Preferred is yttria. The content of the stabilizer in a zirconia pre-sintered body of the present invention, and in a sintered body of the zirconia pre-sintered body can be measured by, for example, inductively coupled plasma (ICP) emission spectral analysis or X-ray fluorescence analysis (XRF).

In view of the strength and translucency of a sintered body, the content of the stabilizer (preferably, yttria) in a zirconia pre-sintered body of the present invention and its sintered body is preferably 3.0 to 7.5 mol %, more preferably 3.5 to 7.0 mol %, even more preferably 4.0 to 6.5 mol % with respect to the total mole of zirconia and stabilizer. The translucency of a sintered body can increase with a yttria content of 3.0 mol % or more, whereas a decrease in the strength of a sintered body can be reduced with a yttria content of 7.5 mol % or less.

In a zirconia pre-sintered body of the present invention, it is preferable that at least a part of the stabilizer be not dissolved in zirconia as a solid solution. That is, at least a part of zirconia crystals preferably exists as being monoclinic in crystal system. Whether a part of stabilizer is not dissolved in zirconia as a solid solution can be determined from an X-ray diffraction (XRD) pattern, for example. The presence of peaks derived from the stabilizer in an XRD pattern of the zirconia pre-sintered body means the presence of a stabilizer that is not dissolved in zirconia as a solid solution in the zirconia pre-sintered body. A peak derived from the stabilizer is basically not observable in an XRD pattern when the stabilizer is fully dissolved as a solid solution. It is, however, possible, depending on the crystal state or other conditions of the stabilizer, that the stabilizer is not dissolved in zirconia as a solid solution even when the XRD pattern does not show peaks for stabilizers. When the predominant crystal system of zirconia is tetragonal and/or cubic and there is no peak attributed to the stabilizer in the XRD pattern, the stabilizer can be thought of having dissolved in zirconia as a solid solution for the most part, basically completely. In a zirconia pre-sintered body of the present invention, it is not required that the stabilizer be fully dissolved in zirconia as a solid solution. In the present invention, “stabilizer being dissolved as a solid solution” means that, for example, the elements (atoms) contained in the stabilizer are dissolved in zirconia as a solid solution.

In a zirconia pre-sintered body of the present invention, the percentage presence $f_y$ of yttria not dissolved in zirconia as a solid solution (hereinafter, also referred to as “undissolved yttria”) can be calculated using the following formula (1).

$$f_y=I_y/(I_{28}+I_{30})*100 \quad (1)$$

In formula (1), $I_y$ represents a peak intensity of yttria near 2θ=29° in an XRD pattern by CuKα radiation, $I_{28}$ represents a peak area near 2θ=28° where the main peak of monoclinic crystal system appears, and $I_{30}$ represents a peak area near 2θ=30° where the main peak of tetragonal crystal system or cubic crystal system appears.

The percentage presence $f_y$ of undissolved yttria is preferably more than 0%, more preferably 1% or more, even more preferably 2% or more, particularly preferably 3% or more. The upper limit of the percentage presence $f_y$ of undissolved yttria depends on the yttria content in the pre-sintered body. The percentage presence $f_y$ may be 15% or less when the yttria content is 7.5 mol % or less with respect to the total mole of zirconia and yttria. For example, the percentage presence $f_y$ may be 7% or less when the yttria content is 3.0 mol % or more and less than 4.5 mol %. The percentage presence $f_y$ may be 10% or less when the yttria content is 4.5 mol % or more and less than 5.5 mol %. The percentage presence $f_y$ may be 11% or less when the yttria content is 5.5 mol % or more and less than 6.5 mol %. The percentage presence $f_y$ may be 15% or less when the yttria content is 6.5 mol % or more and 7.5 mol % or less.

When the yttria content is 3.0 mol % or more and less than 4.5 mol %, the percentage presence $f_y$ is preferably 2% or more, more preferably 3% or more, even more preferably 4% or more, particularly preferably 5% or more. When the yttria content is 4.5 mol % or more and less than 5.8 mol %, the percentage presence $f_y$ is preferably 3% or more, more preferably 4% or more, even more preferably 5% or more, yet more preferably 6% or more, particularly preferably 7% or more. When the yttria content is 5.8 mol % or more and 7.5 mol % or less, the percentage presence $f_y$ is preferably 4% or more, more preferably 5% or more, even more preferably 6% or more, yet more preferably 7% or more, particularly preferably 8% or more.

In a zirconia pre-sintered body of the present invention, the peaks for tetragonal and cubic crystal systems may be essentially undetectable.

In view of increasing the strength and translucency of a sintered body, a zirconia pre-sintered body of the present invention has a density of preferably 2.75 g/cm$^3$ or more, more preferably 2.85 g/cm$^3$ or more, even more preferably 2.95 g/cm$^3$ or more. With a zirconia pre-sintered body having a density of 2.75 g/cm$^3$ or more, the zirconia sintered body can have a translucency of 8.6 or more, and a biaxial flexural strength of 850 MPa or more. The translucency and biaxial flexural strength of a zirconia sintered body can be measured using the methods described in the EXAMPLES section below.

In a zirconia pre-sintered body of the present invention, the crystal grains contained in a sintered body after 2 hours of firing at a firing temperature of 1,500° C. or less have an average crystal grain size of preferably 0.70 μm or less, more preferably 0.68 μm or less, even more preferably 0.65 μm or less. With an average particle diameter of 0.70 μm or less in the particles contained in a sintered body, the zirconia sintered body can have a translucency of 8.6 or more, and a biaxial flexural strength of 850 MPa or more. A density of less than 2.75 g/cm$^3$ in the pre-sintered body is not preferable because the translucency does not improve even when the average particle diameter is small. In a zirconia pre-sintered body of the present invention, it is preferable that a sintered body have a density of 5.8 g/cm$^3$ or more after 2 hours of firing at a firing temperature of 1,500° C. or less.

In view of providing a zirconia sintered body that can satisfy both high strength and high translucency, it is preferable that a zirconia pre-sintered body of the present invention show two peaks in a number-based particle size distribution measured with a captured electron microscope image of larger primary particles and smaller primary particles in the measurement of average particle diameter performed by, for example, analyzing an electron micrograph (for example, SEM) in the manner described in the EXAMPLES section below. In the present invention, a peak means a particle size with a frequency of at least 5%. In view of providing more superior strength and translucency, the frequency is preferably 6% or more, more preferably 7% or more, even more preferably 8% or more. In the number-based particle size distribution, it is preferable that a first peak representing the most frequent particle diameter (mode diameter) occur at a particle size of 10 nm or more and less than 60 nm, and a second peak occur at a particle size of 60 nm or more and 200 nm or less. In view of providing even more superior strength and translucency, it is more preferable that the first peak occur at an average particle size of 10 nm or more and 50 nm or less, and the second peak have a frequency of 8% or more, and it is even more preferable that the first peak occur at an average particle size of 10 nm or more and 50 nm or less, and the second peak be 9% or more.

The following describes a zirconia-containing composition for producing a zirconia pre-sintered body of the present invention. A powder used to produce the zirconia-containing composition is also described.

A zirconia-containing composition is a composition that becomes a precursor of a zirconia pre-sintered body of the present invention. The content of the zirconia and stabilizer in a zirconia-containing composition is calculated from their content in a predetermined zirconia pre-sintered body, and is the same in the zirconia-containing composition and in the zirconia pre-sintered body. The content of the stabilizer in the zirconia-containing composition can be measured using the same method used for the measurement of the stabilizer content in the zirconia pre-sintered body.

The zirconia-containing composition includes a powder, a fluid containing a powder added to a solvent, and a molded body obtained by molding a powder into a predetermined shape. When the zirconia-containing composition has a powder form, the zirconia-containing composition may be a cluster of a powder. The powder is a result of aggregation of primary particles.

In the present invention, a primary particle refers to a bulk representing the smallest unit. For example, a primary particle refers to a spherical body in which primary particles are not bound to one another, and appear separable under an electron microscope (for example, a scanning electron microscope). Primary particles include zirconia particles and stabilizer particles. A secondary particle refers to an aggregate of primary particles.

Preferably, the constituent particles in a zirconia-containing composition of the present invention are predominantly secondary aggregates (secondary aggregated particles). By "predominantly", it means that the content of the secondary aggregates in the zirconia-containing composition is 50 mass % or more, preferably 60 mass % or more, more preferably 70 mass % or more, even more preferably 80 mass % or more, particularly preferably 90 mass % or more. The secondary aggregated particles have an average particle diameter of preferably 100 nm or more and 275 nm or less, more preferably 100 nm or more and 265 nm or less, even more preferably 100 nm or more and 255 nm or less, particularly preferably 100 nm or more and 245 nm or less. With an average particle diameter of 100 nm or more, it is possible to reduce an increase in the adhesion of secondary aggregated particles, and prevent the enlargement of secondary aggregates due to clustering of secondary aggregated particles. A secondary aggregated particle having an average particle diameter of more than 275 nm is not preferable because the density of the molded body does not increase, and the strength and/or translucency decrease after sintering due to the "skeleton effect" (the effect of particle-to-particle contact and support) during press forming. The measurement method of the average particle diameter of secondary aggregated particles is as described in the EXAMPLES section below.

The constituent particles of the secondary aggregated particle contain a larger particle having an average primary particle diameter of 100 nm or more and 200 nm or less, and a smaller particle having an average primary particle diameter of 10 nm or more and less than 60 nm. The larger particles have an average primary particle diameter of preferably 104 nm or more and 175 nm or less, more preferably 108 nm to 150 nm, even more preferably 110 nm or more and 135 nm or less. The measurement method of the average primary particle diameter of the larger particles and smaller particles is as described in the EXAMPLES section below. When the average primary particle diameter of the larger particles is less than 100 nm, it may not be possible to obtain a high-density composition as a result of the larger particles strongly aggregating with the smaller particles, and forming a hard shell on the powder surface. When the average primary particle diameter of the larger particles is more than 200 nm, it may not be possible to achieve high translucency and high strength because the pre-sintered body becomes less sinterable, and the density does not easily increase after firing unless a higher sintering temperature is employed. The smaller particles have an average primary particle diameter of preferably 15 nm or more and 50 nm or less, more preferably 20 nm or more and 50 nm or less, even more preferably 25 nm or more and 50 nm or less. A smaller particle having an average primary particle diameter of less than 10 nm is not preferable because a high-density composition cannot be obtained as a result of the formation of a hard shell on the powder surface. A smaller particle having an average particle diameter of more than 50 nm is not preferable because a lower firing temperature cannot be employed. The preferred form is one in which the smaller particles are adhering around the larger particles when viewed in an electron microscope image, for example. In order to position the smaller particles around the larger particles, the preferred design controls the surface potentials of the larger particles and the smaller particles to opposite signs so that the larger particles and the smaller particles are attracted to each other.

Because the average particle diameter of the secondary aggregate varies with the mixing ratio of a powder of the larger particles and a powder of the smaller particles, the content of the larger particles in the secondary aggregate is preferably 15 to 85 mass %, more preferably 18 to 83 mass %, even more preferably 20 to 80 mass %. With more than 85 mass % of larger particles, fewer smaller particles may adhere to the larger particles. With less than 15 mass % of larger particles, it may not be possible to obtain a high-density composition because of the hard shell formed on the powder surface due to the excessive proportion of smaller particles.

The zirconia in the zirconia-containing composition may have a powder form in 50% or more, preferably 70% or more, more preferably 80% or more, even more preferably 90% or more of the zirconia contained in the zirconia-containing composition.

The zirconia-containing composition has a light bulk density of preferably 1.0 g/cm$^3$ or more, more preferably 1.1 g/cm$^3$ or more, even more preferably 1.2 g/cm$^3$ or more, particularly preferably 1.3 g/cm$^3$ or more. The light bulk density can be measured in compliance with JIS R 9301-2-3.

The zirconia-containing composition has a heavy bulk density of 1.3 g/cm$^3$ or more, more preferably 1.4 g/cm$^3$ or more, even more preferably 1.5 g/cm$^3$ or more. The heavy bulk density can be measured in compliance with JIS R 9301-2-3.

The zirconia-containing composition may comprise a binder.

The binder may be, for example, an organic binder. Examples of the organic binder include common organic binders such as acrylic binders, acrylic acid binders, paraffinic binders, fatty acid binders, and polyvinyl alcohol binders. Preferred among such organic binders are those having a carboxyl group in the molecular chain, or carboxylic acid derivatives. More preferred are acrylic binders (for example, polyacrylic acid). Even more preferred are polyacrylic acid salts having water solubility. The polyacrylic acid salts may be products of copolymerization of acrylic acid or methacrylic acid with maleic acid, and may contain sulfonic acid. Examples of cations of the salts include sodium and ammonium.

The content of the binder in the zirconia-containing composition is important for adjustments of the distance between primary particles in the zirconia-containing composition. The binder content is preferably 1.0 to 3.0 mass %, more preferably 1.2 to 2.8 mass %, even more preferably 1.4 to 2.6 mass % in the whole zirconia-containing composition. Chipping (defects) may occur in the molded body when the binder content is less than 1.0 mass % in the whole zirconia-containing composition. With a binder content of more than 3.0 mass %, the molded body may fail to improve its density, and the strength and/or translucency of the sintered body may decrease.

The zirconia-containing composition may optionally comprise an additive such as a colorant (including a pigment, a composite pigment, and a fluorescent agent), alumina ($Al_2O_3$), titanium oxide ($TiO_2$), silica ($SiO_2$), a dispersant (such as polyacrylic acid, or 3-phenylpropionic acid), or an antifoaming agent. These components may be used alone, or two or more thereof may be used in combination. The pigment may be, for example, an oxide of at least one element selected from the group consisting of Ti, V, Cr, Mn, Fe, Co, Ni, Zn, Y, Zr, Sn, Sb, Bi, Ce, Sm, Eu, Gd, and Er. Examples of the composite pigment include $(Zr,V)O_2$, $Fe(Fe,Cr)_2O_4$, $(Ni,Co,Fe)(Fe,Cr)_2O_4ZrSiO_4$, and $(Co,Zn)Al_2O_4$. Examples of the fluorescent agent include $Y_2SiO_5$:Ce, $Y_2SiO_5$:Tb, $(Y,Gd,Eu)BO_3$, $Y_2O_3$:Eu, YAG:Ce, $ZnGa_2O_4$:Zn, and $BaMgAl_{10}O_{17}$:Eu.

The additive may be added at the time of mixing or pulverizing, or may be added after pulverization.

An example of a zirconia pre-sintered body production method is a method that comprises using a powder (A) that comprises a secondary aggregate comprising a powder (a1) having an average primary particle diameter of 100 nm or more and 200 nm or less, and a powder (a2) having an average primary particle diameter of 10 nm or more and less than 60 nm, the secondary aggregate having an average particle diameter of 275 nm or less, the secondary aggregate comprising zirconia, and a stabilizer capable of preventing a phase transformation of zirconia. The following describes a powder production process.

The method of production of a powder (A) is not particularly limited. It is possible to employ a method, for example, such as the breakdown process, in which coarse particles are pulverized into finer particles, and the building-up process, which synthesizes particles through nucleation and growth from atoms or ions. An example method of production of a powder (A) is a method comprising producing a slurry comprising a secondary aggregate that comprises a powder (a1) having an average primary particle diameter of 100 nm or more and 200 nm or less, a powder (a2) having an average primary particle diameter of 10 nm or more and less than 60 nm, and that has an average particle diameter of 275 nm or less, and granulating the slurry by spray drying to obtain a powder (A). The powder (a1) may be a zirconia powder or a stabilizer powder, or may contain both a zirconia powder and a stabilizer powder. When the powder (a1) contains a zirconia powder, the powder (a2) preferably contains a stabilizer powder. When the powder (a1) contains a stabilizer powder, the powder (a2) preferably contains a zirconia powder. The powder (a1) corresponds to the larger particle. The powder (a2) corresponds to the smaller particle. The secondary aggregate comprises particles comprising zirconia, and a stabilizer capable of preventing a phase transformation of zirconia.

For example, zirconia and a stabilizer are mixed in predetermined proportions to prepare a mixture (mixing step). A powder of a predetermined raw material compound is selected so as to obtain a powder (a1) having an average primary particle diameter of 100 nm or more and 200 nm or less, and a powder (a2) having an average primary particle diameter of 10 nm or more and less than 60 nm. When the stabilizer is yttria, zirconia and yttria may be mixed in such proportions that the yttria content falls in the foregoing ranges. The powder (a1) and powder (a2) may be mixed dry or wet. The zirconia-containing composition may be pulverized so that the particles contained in the slurry have the desired particle diameter (for example, about 100 nm) (pulverization step). The mixing and pulverization may be performed in a single step. For pulverization, the composition may be pulverized with, for example, a ball mill or a bead mill after dispersing the composition and the binder in a solvent such as water (dispersing step). After the mixing step and/or pulverization step, the mixture can have a powder form, such as above, by being spray dried with a spray dryer or the like (drying step). A powdery zirconia-containing composition (powder (A)) according to the present invention can be produced in this fashion.

Preferably, the composition shows two peaks in a number-based particle size distribution measured with a captured electron microscope image of powder (A). In the present invention, the frequency of a peak in the powder (A) is at least 3%. In view of obtaining more superior strength and translucency, the frequency is preferably 4% or more, more preferably 5% or more, even more preferably 6% or more. In the number-based particle size distribution of powder (A), it is preferable that a first peak representing the most frequent particle diameter (mode diameter) occur at a particle size of 10 nm or more and less than 60 nm, and a second peak occur at a particle size of 60 nm or more and 200 nm or less. In view of providing even more superior strength and translucency, it is more preferable that the first peak occur at an average particle size of 10 nm or more and 50 nm or less, and the second peak have a frequency of 4% or more, and it is even more preferable that the first peak occur at an average particle size of 10 nm or more and 50 nm or less, and the second peak be 5% or more. In the number-based particle size distribution of powder (A), the difference in frequency (%) between the first peak, representing the most frequent particle diameter (mode diameter), and the second peak is preferably 20% or less, more preferably 18% or less, even more preferably 15% or less. The difference in frequency (%) is preferably more than 0%, more preferably 0.5% or more, even more preferably 1.0% or more.

In the pulverization step, it is preferable to use a microsize pulverization medium, for example, a pulverization medium of 100 μm or less. Preferably, the pulverization is followed by classification.

Preferably, zirconia and the stabilizer are separately prepared. For example, it is preferable to provide separate independent preparation steps (for example, production steps) for zirconia and stabilizer, instead of simultaneously precipitating zirconia and stabilizer (in the same step). In this way, dissolution of the stabilizer in zirconia as a solid solution can be reduced in the production of pre-sintered body described below.

The powder (A) can be formed into a molded body by applying an external force. The molding method is not limited to specific methods, and a suitable method can be appropriately selected according to intended use. For example, molding can be achieved by a method such as press forming, injection molding, or stereolithography. Molding may be performed in phases. For example, the zirconia-containing composition may be additionally subjected to CIP after press forming.

The molded body may have a shape of a disc or a cuboid, or a shape of a dental product (for example, a crown shape).

For example, the molded body may be a columnar molded body obtained by filling a zirconia powder (the powder (A) containing zirconia and a stabilizer capable of preventing a phase transformation of zirconia) into a die, and packing the powder by uniaxial pressing. The molded body can have increased density by increasing the surface pressure of press forming. However, a zirconia molded body with an excessively high density produces a hard zirconia pre-sintered body. Accordingly, the surface pressure of press forming is preferably 30 to 200 MPa. With a surface pressure of 30 MPa or more in press forming, the molded body can have excellent shape retainability. With a surface pressure of 200 MPa or less, the density of the molded body does not overly increase, and it is easier to prevent hardening.

The molded body includes molded bodies compacted by a high-temperature pressing process such as CIP (Cold Isostatic Pressing). In view of the above, the hydraulic pressure is preferably 30 to 200 MPa.

A zirconia pre-sintered body of the present invention can be a precursor (intermediate product) of a zirconia sintered body. The pre-sintered body includes those subjected to a molding process. A zirconia pre-sintered body according to the present invention includes, for example, dental products (for example, crown-shaped prostheses) obtained by processing a pre-sintered zirconia disc with a CAD/CAM (Computer-Aided Design/Computer-Aided Manufacturing) system.

The content of the zirconia and stabilizer in a zirconia pre-sintered body of the present invention is the same as the content of the zirconia and stabilizer in the zirconia-containing composition or molded body to be fabricated into the zirconia pre-sintered body. The stabilizer is preferably yttria in view of the strength and translucency of a sintered body fabricated from a zirconia pre-sintered body of the present invention. The molded body is a result of molding a zirconia-containing composition (for example, by press forming), and the content of the zirconia and stabilizer in the molded body can be regarded as the same as that in the zirconia-containing composition.

The undissolved fraction of the stabilizer in a zirconia pre-sintered body of the present invention is calculated as percentage presence $f_y$ of undissolved yttria as noted above, and is dependent on the pre-sintering temperature.

The pre-sintering temperature in a production method of a zirconia pre-sintered body of the present invention is preferably 830 to 1,080° C., more preferably 850 to 1,050° C., even more preferably 895 to 1,000° C. With a pre-sintering temperature of less than 830° C., the pre-sintered body cannot exhibit sufficient strength or hardness, and ease of milling may decrease. With a pre-sintering temperature of more than 1,080° C., ease of milling may decrease as a result of an increased strength or hardness of the pre-sintered body, or a phase transformation may occur in part of the tetragonal crystal system and/or cubic crystal system under heat as a result of an increased amount of stabilizer in the solid solution, depending on the content of the stabilizer.

It is preferable to retain the material at the highest pre-sintering temperature for a certain time period because it may be possible to confine the hardness of the pre-sintered body in the preferred range, and provide good ease of milling. The pre-sintering conditions depend on the density of the pre-sintered body, the average particle diameter of the pre-sintered body, and the binder content. Preferably, the material is retained at the highest pre-sintering temperature for 30 minutes to 6 hours. The rate of temperature increase and the rate of temperature decrease are preferably 300° C./min or less.

A zirconia pre-sintered body of the present invention can be milled to fabricate a milling workpiece. The milling method is not limited to specific methods, and a suitable method may be appropriately selected according to intended use. For example, a zirconia disc (pre-sintered body) can be milled into a shape of a dental product (for example, a crown-shaped prosthesis) with a CAD/CAM system to fabricate a milling workpiece.

The surface smoothness of a milling workpiece can be increased by using a tool such as a polisher (for example, PearlSurface® manufactured by Kuraray Noritake Dental Inc.).

A zirconia sintered body (hereinafter, also referred to simply as "zirconia sintered body" or "sintered body") can be fabricated through the sintering step of firing a zirconia pre-sintered body of the present invention or its milling workpiece at a temperature that sinters zirconia particles. In view of controlling grain growth and obtaining a high-translucency and high-strength sintered body, the firing temperature is, for example, preferably 1,300 to 1,600° C., more preferably 1,350 to 1,550° C., even more preferably 1,350 to 1,450° C. With these ranges of firing temperatures, the crystal grains contained in the sintered body can have an average crystal grain size of 0.7 μm or less, and the sintered body can have high translucency and high strength with a density of 5.8 g/cm$^3$ or more.

In the sintering step, the retention time at the sintering temperature (for example, the highest firing temperature) is preferably less than 120 minutes, more preferably 90 minutes or less, even more preferably 75 minutes or less, yet more preferably 60 minutes or less, particularly preferably 45 minutes or less, most preferably 30 minutes or less. The retention time is preferably 1 minute or more, more preferably 5 minutes or more, even more preferably 10 minutes or more.

With a zirconia pre-sintered body of the present invention, the firing time for the fabrication of a sintered body can be reduced without causing a decrease in the translucency and strength of the zirconia sintered body fabricated. Particularly, the retention time at the highest firing temperature can be reduced for the fabrication of a sintered body (short sintering). This makes it possible to increase the production efficiency, and, when a zirconia pre-sintered body of the present invention is applied to dental products, the patient can experience a reduction in time-related stress because it takes a shorter time before a treatment can be started with a dental product after its dimensions are determined and milling is finished for the treatment. It is also possible to reduce the energy cost.

In the sintering step, the retention time at the sintering temperature (for example, the highest firing temperature) may be, for example, 25 minutes or less, 20 minutes or less, or 15 minutes or less.

Preferably, the rate of temperature increase and the rate of temperature decrease in the sintering step are set so as to reduce the time required for the sintering step. For example, the rate of temperature increase may be set so that the highest firing temperature is reached in the shortest possible time, depending on the capabilities of the furnace. The rate of temperature increase to the highest temperature may be, for example, 10° C./min or more, 50° C./min or more, 100° C./min or more, 120° C./min or more, 150° C./min or more, or 200° C./min or more. Preferably, the rate of temperature decrease is set to a rate that does not cause defects, such as cracks, in the sintered body. For example, the sintered body may be allowed to cool at room temperature after the heating is finished.

The following describes a zirconia sintered body obtained by sintering a zirconia pre-sintered body of the present invention or its milling workpiece. A zirconia sintered body can be described as, for example, a state after zirconia particles have sintered. The zirconia sintered body has a relative density of preferably 99.5% or more. The relative density can be calculated as a ratio of the actual density, measured by the Archimedes method, with respect to the theoretical density. By "relative density", it means a value obtained by theoretically dividing density d1 by density d2, where d1 is the density of a sintered body after high-temperature firing of a molded body prepared by filling a powder into a specific mold, and pressing the powder into a specific shape, and d2 is the density of zirconia (with no internal voids).

Aside from a sintered body obtained by sintering the molded zirconia particles under ordinary pressure or under no applied pressure, the zirconia sintered body includes sintered bodies compacted by a high-temperature pressing process such as HIP (Hot Isostatic Pressing).

Because zirconia sintered bodies with higher densities show fewer internal voids and scatter less light, it is preferable in view of improving translucency that the density of the zirconia sintered body be 5.80 g/cm$^3$ or more, more preferably 5.82 g/cm$^3$ or more, even more preferably 5.87 g/cm$^3$ or more. Particularly preferably, the zirconia sintered body contains essentially no voids.

Concerning the average crystal grain size of crystal grains contained in the zirconia sintered body, the zirconia sintered body preferably contains more particles that are smaller than the wavelengths of visible light because the zirconia sintered body can have higher translucency and higher strength with such particles. The range of average crystal grain sizes is preferably 0.70 μm or less, more preferably 0.68 μm or less, even more preferably 0.65 μm or less. The average crystal grain size of crystal grains contained in the zirconia sintered body can be measured by the method described in the EXAMPLES section below.

The content of the zirconia and stabilizer in the zirconia sintered body is the same as the content of the zirconia and stabilizer in the composition and/or pre-sintered body to be fabricated into the sintered body. Concerning the crystal systems of zirconia in the sintered body, the fraction of the monoclinic crystal system is preferably 10% or less, more preferably 5% or less. Even more preferably, the monoclinic crystal system is essentially absent (can be regarded as 0%). The tetragonal and/or cubic crystal systems represent crystal systems other than the monoclinic crystal system.

Concerning the fraction of the stabilizer dissolved as a solid solution in the zirconia sintered body, it is preferable that 95% or more of the stabilizer contained be dissolved in zirconia as a solid solution. More preferably, essentially all the stabilizer is dissolved in zirconia as a solid solution. The percentage presence $f_y$ of undissolved yttria is preferably 5% or less, more preferably 1% or less. Even more preferably, essentially all the yttria is dissolved as a solid solution (the percentage presence $f_y$ of undissolved yttria is 0%).

Preferably, the zirconia sintered body has the highest strength possible. For example, the strength is preferably 800 MPa or more, more preferably 820 MPa or more, even more preferably 840 MPa or more in terms of a biaxial flexural strength. The biaxial flexural strength can be measured in compliance with ISO 6872: 2015, for example, using the method described in the EXAMPLES section below.

The zirconia sintered body has a translucency of preferably 8.6 or more, more preferably 10 or more, even more preferably 11 or more. As used herein, "translucency" takes a lightness value L*(color space) of L*a*b*color system (JIS Z 8781-4:2013), and it is a value after subtracting a second L* value from a first L* value, where the first L* value is an L* value measured for a 1.2 mm-thick specimen against a white background, and the second L* value is an L* value measured for the same specimen against a black background. A specimen can be prepared as follows, for example. First, a powder (composition) is press formed to provide a thickness of 1.2 mm for the sintered body to be produced, and subsequent CIP molding forms, for example, a disc-shaped molded body measuring 19 mm in diameter. The molded body can then be fired under predetermined firing conditions to prepare a sintered body as a specimen having a thickness of 1.2 mm. For the measurement of L* values, a color-difference meter (for example, dental colorimeter Crystaleye CE100-DC/JP, analysis software Crystaleye (manufactured by Olympus Corporation)) can be used to measure L* values against black and white backgrounds after applying a contact liquid to a specimen surface. The contact liquid may be, for example, one having a refractive index nD of 1.60 as measured at 589 nm wavelength (sodium D-line).

The zirconia sintered body may be a molded body of a predetermined shape. For example, the sintered body may have a shape of a disc (discotic), a cuboidal shape, or a shape of a dental product (for example, a crown shape).

The methods of production of the composition, powder, molded bodies, pre-sintered bodies, milling workpieces, and sintered bodies described in the present specification are not limited those described above, and a variety of known methods are applicable, as long as the desired features and effects of the present invention are obtained.

A pre-sintered body of the present invention can be suitably used for zirconia worked products, for example, such as dental materials, optical fiber cable connectors, and the casing of smartphones, which require strength or aesthetics, or both, after firing.

EXAMPLES

The present invention is described below in greater detail by way of Examples. It is to be noted, however, that the present invention is in no way limited by the following EXAMPLES.

<Measurement of Average Particle Diameter of Powder>

A powder obtained in each Example and Comparative Example below was impregnated with a two-component curable epoxy resin (MA2+ manufactured by MEIWAFOSIS CO., LTD. under this trade name) under vacuum, and embedded therein over the course of 12 hours. The resultant cured product was ground with abrasive paper to expose a powder cross section, and a surface image (SEM image) was taken with an ultra high resolution analytical scanning electron microscope (SU-70 manufactured by Hitachi, Ltd. under this trade name). The image was analyzed to calculate the average particle diameter, and this diameter was determined as the average particle diameter of the secondary aggregate of the powder. Image analyzing software Image-Pro Plus, manufactured by Hakuto Co., Ltd., was used for the measurement of average particle diameter. The captured SEM image was binarized, and particles were recognized from the field (region) after marking out grain boundaries of each crystal grain on the binarized image. The particle diameter obtained by Image-Pro Plus is the diameter through the center of gravity of the particle. The average particle diameter is obtained by finding the average of the measured length of a line segment, determined from the contour line of the particle, passing through the center of gravity and connecting the contour line, by taking measurements in two-degree increments around the center of gravity. A mean value of ten fields for one sample of each Example and Comparative Example was determined as the average particle diameter of the powder. Concerning the primary particle diameters of particles in the secondary aggregate, because the number-based particle size distribution has two peaks in the present invention, the average particle diameter was determined for each peak by separating the peaks, and these average particle diameters were determined as the average particle diameters of the larger particles and smaller particles. The two peaks were separated by Gaussian fitting or Lorentz fitting using particle size distribution data obtained by image analysis, and the average particle diameter was calculated for each single peak. For peak separation, it is also possible to use, for example, the peak separation file in the link below.

https://www.jie.or.jp/publics/index/497/

Figure 5A:
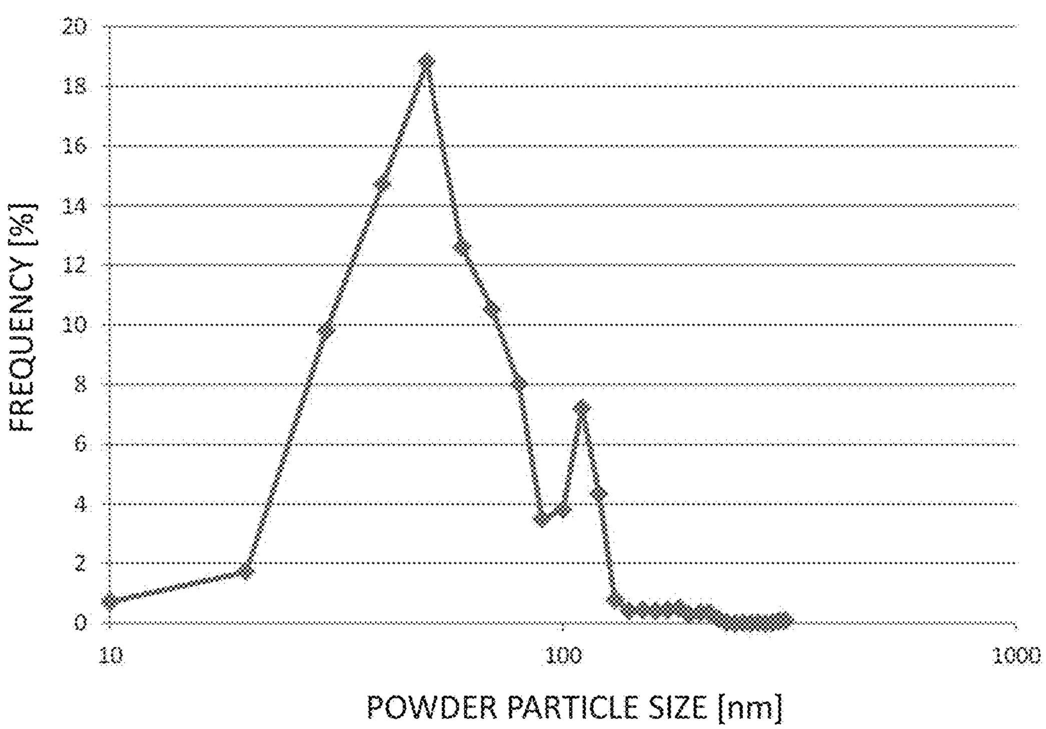
FIG. 5A shows a particle size distribution (number-based) of a zirconia powder according to Example 1.
Figure 5B:
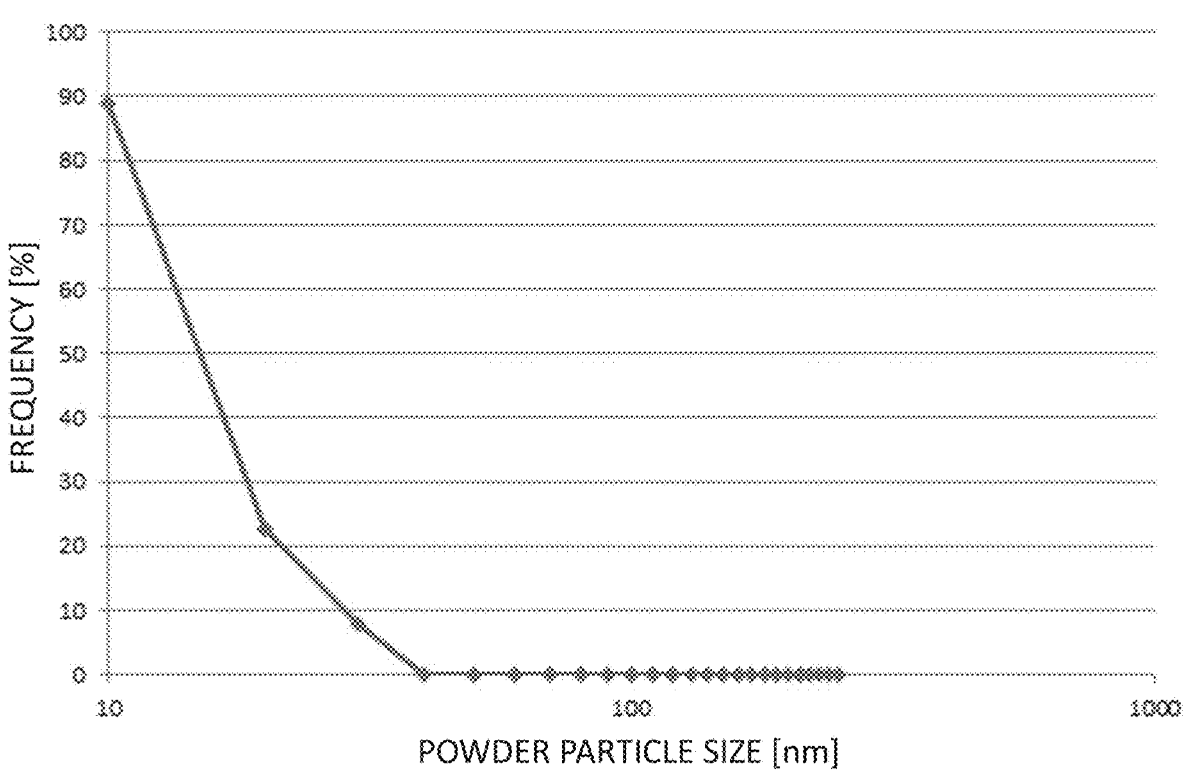
FIG. 5B shows a particle size distribution (number-based) of a zirconia powder according to Comparative Example 4.

FIG. 5A shows a particle size distribution (number-based) of the powder according to Example 1. FIG. 5B shows a particle size distribution (number-based) of the powder according to Comparative Example 4. The vertical axis represents frequency (%), and the horizontal axis represents particle diameter (nm).

<Measurement of Median Diameter D50 of Particles in Slurry>

The median diameter D50 was measured by volume with ultrasonic waves being applied after a slurry diluted with water was subjected to 30 minutes of ultrasonication, using a laser diffraction/scattering particle size distribution analyzer (manufactured by Horiba Ltd. under the trade name Partica LA-950). From the measurement result, the particle size at 50% cumulative frequency was determined as median diameter D50 by calculations on software.

<Evaluation Method of Shape Retainability of Molded Body>

The powder obtained in each Example or Comparative Example below was filled into a columnar die, and, with the powder held between the upper and lower dies, pressure was uniaxially applied until a stress of 33 MPa was reached. After being pressed, the molded body was taken out of the die, and visually checked for chipping at the corners of the rectangle (n=5). The shape retainability was determined as inferior (Poor) when chipping (defects) measuring 0.7 mm or larger was observed in two or more of the five samples, and superior (Good) when chipping was not observed.

<Measurement of Average Particle Diameter of Pre-Sintered Body>

Figure 6A:
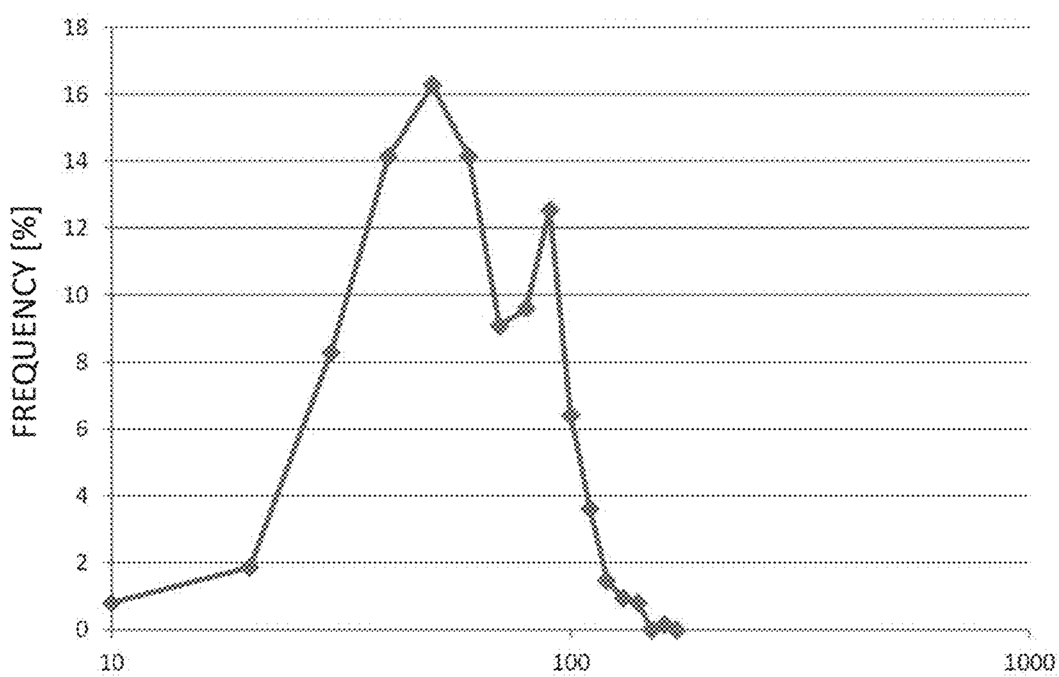
FIG. 6A shows a particle size distribution (number-based) of a zirconia pre-sintered body according to Example 1.
Figure 6B:
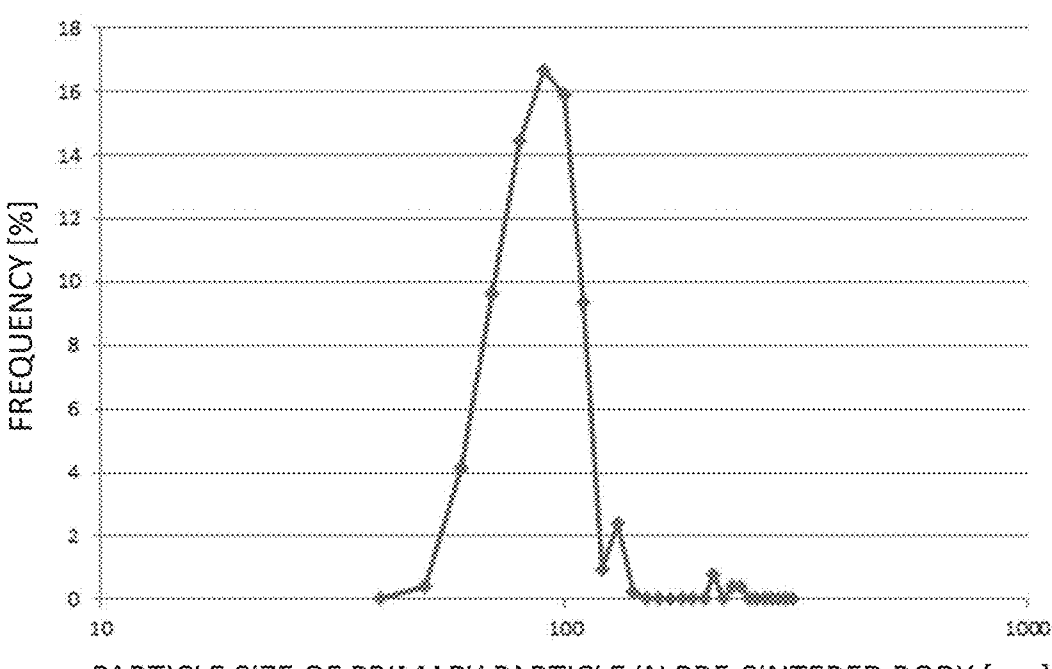
FIG. 6B shows a particle size distribution (number-based) of a zirconia pre-sintered body according to Comparative Example 4.

The pre-sintered body obtained in each Example or Comparative Example below was used to obtain a surface image, using a scanning electron microscope (manufactured by Keyence under the trade name VE-9800). The acquired image was analyzed to measure the average particle diameter, and this average particle diameter was determined as the average particle diameter of the secondary aggregate of the pre-sintered body. Image analyzing software Image-Pro Plus, manufactured by Hakuto Co., Ltd., was used for the measurement of average particle diameter. The particle diameter obtained by Image-Pro Plus is the diameter through the center of gravity of the particle. The average particle diameter is obtained by finding the average of the measured length of a line segment, determined from the contour line of the particle, passing through the center of gravity and connecting the contour line, by taking measurements in two-degree increments around the center of gravity. A mean value of ten fields for one sample of each Examples and Comparative Example was determined as the average particle diameter of the pre-sintered body. Concerning the primary particle diameters of particles in the secondary aggregate, because the particle size distribution has two peaks in the present invention, the average particle diameter was determined for each peak by separating the peaks, and these average particle diameters were determined as the average particle diameters of the larger particles and smaller particles. FIG. 1 shows a scanning electron micrograph of the zirconia pre-sintered body according to Example 1. FIG. 6A shows a particle size distribution (number-based) of the zirconia pre-sintered body according to Example 1. FIG. 6B shows a particle size distribution (number-based) of the zirconia pre-sintered body according to Comparative Example 4. The vertical axis represents frequency (%), and the horizontal axis represents the particle diameter (nm) of primary particles contained in the zirconia pre-sintered body.

<Method of Determination of Absence of Partial Formation of Solid Solution of Stabilizer with Zirconia in Zirconia Pre-Sintered Body>

Whether at least a part of the stabilizer has not formed a solid solution in a zirconia pre-sintered body of the present invention was determined by producing a 2 mm in thickness plate of zirconia pre-sintered body, and finding the presence or absence of a peak near 29° by taking measurements on the plate under the conditions below, using an Automated Horizontal Multipurpose X-Ray Diffractometer (SmartLab, manufactured by Rigaku Corporation) and X-Ray Analysis Integrated Software (SmartLab Studio II, manufactured by Rigaku Corporation). For the determination of the presence or absence of a peak, the stabilizer was determined as being present without forming a solid solution (Present) when the peak of the stabilizer was 1 or more at 2θ=10 to 90°, relative to the peak with the highest intensity taken as 100. The stabilizer was considered as having formed a solid solution, and not being present by itself when the peak of the stabilizer was less than 1 (Absent).

X-ray source: CuKα (λ=1.54186 Å)
Goniometer length: 300 mm
Optical system: convergent
Detector: high-speed one-dimensional X-ray detector (D/teX Ultra 250)
Monochromatization: Kβ filter
Tube voltage: 40 kV
Tube current: 30 mA
Scan axis: 2θ/θ
Scan speed: 0.2°/m in
Sampling step: 0.01°

<Measurement Method of Primary Particle Content [volume %] in Secondary Aggregate of Pre-Sintered Body>

The particle volume was calculated for each particle from the particle diameter of each particle obtained in Image-Pro Plus. Because the particle size distribution has two peaks, the volume percentage was determined for each peak after separating the two peaks.

<Measurement Method of Density of Pre-Sintered Body>

The pre-sintered body obtained in each Example or Comparative Example below was fabricated into a cuboidal shape having a 14 mm×14 mm base, and the density was determined as a ratio of (mass of pre-sintered body) to (volume of pre-sintered body), using a micrometer and a precision balance (a mean value for n=3).

<Measurement Method of Average Crystal Grain Size in Sintered Body>

Figure 7:
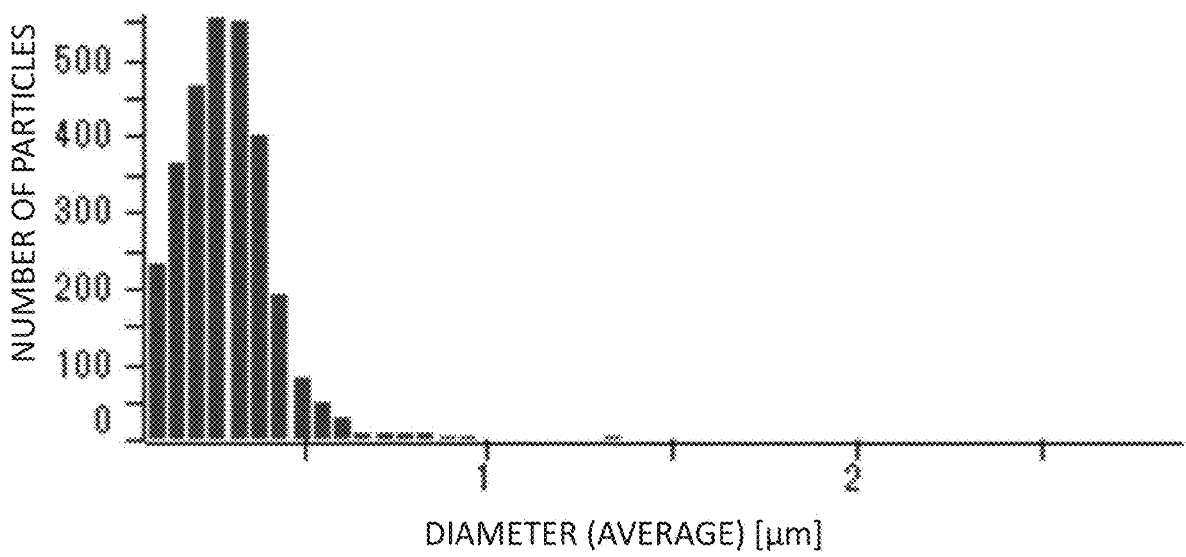
FIG. 7 shows a particle size distribution (number-based) of a zirconia sintered body according to Example 1.

A surface image was taken for the sintered body obtained in each Example or Comparative Example below, using a scanning electron microscope (manufactured by Keyence under the trade name VE-9800). The acquired image was analyzed to calculate the average crystal grain size. Image analyzing software Image-Pro Plus, manufactured by Hakuto Co., Ltd., was used for the measurement of average crystal grain size. The captured SEM image was binarized, and particles were recognized from the field (region) by adjusting the brightness range to provide clear grain boundaries. The crystal grain size obtained by Image-Pro Plus is the diameter through the center of gravity of the crystal grain. The average crystal grain size is obtained by finding the average of the measured length of a line segment, determined from the outline of the particle, passing through the center of gravity and connecting the outline, by taking measurements in two-degree increments around the center of gravity. A mean value of ten fields for one sample of each Example and Comparative Example was determined as the average crystal grain size in the sintered body. FIG. 7 shows the result of the measurement of a particle size distribution (number-based) of average crystal grain sizes in the zirconia sintered body according to Example 1. In FIG. 7, the vertical axis represents the number of particles, and the horizontal axis represents diameter (μm).

<Measurement Method of Density of Sintered Body>

The columnar sintered body obtained in each Example or Comparative Example below was accurately measured for dimensions with a micrometer. The mass was measured with a precision balance. The density was calculated as a ratio of (mass of sintered body) to (volume of sintered body) (a mean value for n=3). The sintered body was evaluated as being "Good" when the density was 5.80 g/cm$^3$ or more, and "Poor" when the density was less than 5.80 g/cm$^3$.

<Evaluation of Translucency of Sintered Body>

The sintered body obtained in each Example or Comparative Example below was ground into a 1.2 mm-thick plate specimen. The specimen was then measured for lightness ($L_W$*) by measuring chromaticity against a white background using a spectrophotometer (Crystaleye manufactured by Olympus Corporation under this trade name) in 7-band measurement mode with an LED light source. The same specimen was also measured for lightness ($L_B$*) by measuring chromaticity against a black background using the same measurement device in the same measurement mode with the same light source. The difference between these values ($\Delta L^*=(L_W^*)-(L_B^*)$) was then determined as the translucency ($\Delta L^*(W-B)$) (n=3). Tables 1 to 3 show the mean values of measured values. The sintered body was evaluated as being "Good" when it had a translucency ΔL*(W−B) of 11 or more, "Moderate" when the translucency ΔL*(W−B) was 8.6 or more and less than 11, and "Poor" when the translucency ΔL*(W−B) was less than 8.6.

<Measurement Method of Biaxial Flexural Strength of Sintered Body>

A sintered body, measuring 15 mm in diameter and 1.2 mm in thickness, was obtained by using the method of Example or Comparative Example. The sintered body was then measured for biaxial flexural strength in compliance with JIS T 6526:2012, using a universal precision tester autograph (trade name AG-I 100 kN, manufactured by Shimadzu Corporation) at a crosshead speed of 0.5 mm/min (n=5). The sintered body was evaluated as being "Good" when it had a biaxial flexural strength of 840 MPa or more, and "Poor" when the biaxial flexural strength was less than 840 MPa.

Examples 1 to 18 and Comparative Examples 1 to 6, 12, and 13

Figure 4:
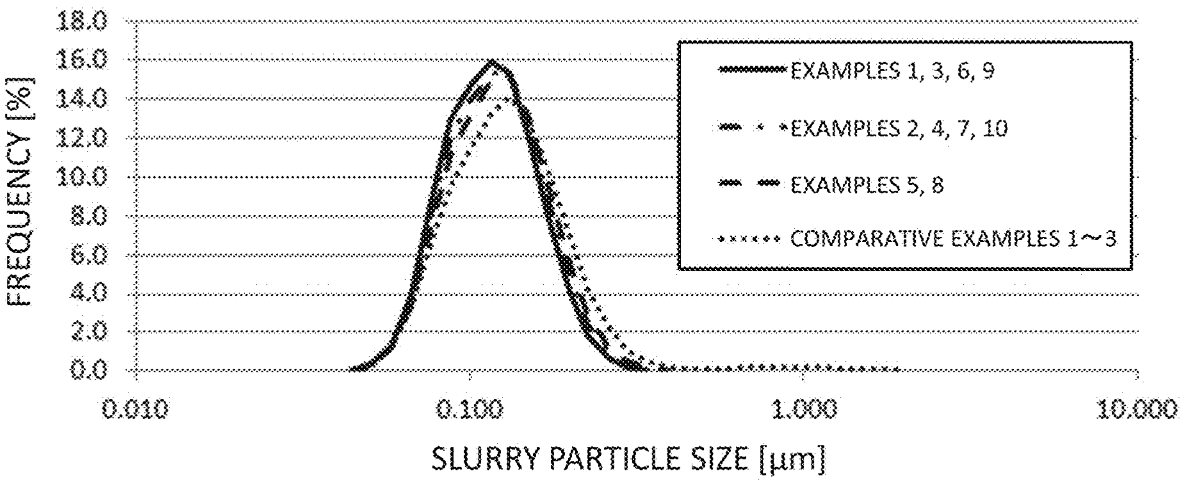
FIG. 4 shows particle size distributions (by volume) of zirconia slurries according to Examples 1 to 10 and Comparative Examples 1 to 3.

A zirconia raw material and a yttria raw material, separately prepared, were weighed so as to give the mass percentages shown in Table 1. After being introduced into water, these materials were placed in a rotary container with zirconia beads, and were mixed by being pulverized with a ball mill until the particles contained in the slurry had the desired particle diameter. The particle diameter was measured by volume with ultrasonic waves being applied after a slurry diluted with water was subjected to 30 minutes of ultrasonication, using a laser diffraction/scattering particle size distribution analyzer (manufactured by Horiba Ltd. under the trade name Partica LA-950). The desired slurry was obtained after about 20 hours of process with a ball mill. FIG. 4 shows particle size distributions (by volume) of slurries measured with the laser diffraction/scattering particle size distribution analyzer for the slurries of Examples 1 to and Comparative Examples 1 to 3. In FIG. 4, the vertical axis represents frequency (%) as a percentage of the particle diameter divided by the total number of particles. As can be seen in FIG. 4, the slurries used in Comparative Examples 1 to 3 showed a small peak on the larger particle side, confirming the presence of larger particles near 1 μm. In Example 1, a surface image was obtained using a scanning electron microscope, and the acquired image was analyzed to measure and determine the average particle diameter for the secondary aggregate of the powder, and the secondary aggregate of the pre-sintered body, according to the measurement of the average particle diameter of the powder, and the measurement of the average particle diameter of the pre-sintered body. The results are presented in FIG. 5A and FIG. 6A. FIG. 5A shows a particle size distribution (number-based) of the zirconia powder according to Example 1. FIG. 6A shows a particle size distribution (number-based) of the zirconia pre-sintered body.

An organic binder was added was added to the slurry obtained, and the mixture was stirred with rotary vanes. After stirring, the slurry was dried to granulate into a powder, using a spray dryer. The powder had an average particle diameter of 40 μm. The powder was poured into a columnar die, and was uniaxially pressed under 33 MPa pressure, followed by CIP at 170 MPa to obtain a molded body. The molded body was placed in an electric furnace, and the temperature was increased from room temperature at 10° C./min. After being retained at 500° C. for 2 hours to debind the organic components, the molded body was held at 1,000° C. for 2 hours, and was gradually cooled at −0.4° C./min to obtain a pre-sintered body. The pre-sintered body was heated at 10° C./min to the firing temperature shown in Table 2, and retained for 2 hours to obtain a sintered body.

The following raw materials 1 to 6 were used as zirconia and yttria raw materials.

For raw material 1, a dry powder was obtained by spray drying zirconia after wet pulverization in water. Raw material 1 was monoclinic in 99% or more of the crystal system, and had an average primary particle diameter of 100 nm, and a BET specific surface area of 7.8 m$^2$/g.

Raw material 2 was obtained after wet pulverization and classification of zirconia. During wet pulverization, 2 mass % of polyacrylic acid was added, and the mixture was spray dried to obtain a dry powder. Raw material 2 was monoclinic in 99% or more of the crystal system, and had an average primary particle diameter of 40 nm, and a BET specific surface area of 60 m$^2$/g.

For raw material 3, surface-modified nano zirconia was obtained by liquid-phase synthesis. Zirconium hydroxide obtained by hydrating zirconium oxychloride was added into a nitric acid aqueous solution, and ultrasonically dispersed until the solution turned transparent. Precipitates, generated after adding 2 mass % of 3-phenylpropionic acid and polyacrylic acid to the filtrate after filtration, were washed with water, and dried to obtain a dry powder. Raw material 3 was monoclinic in 99% or more of the crystal system, and had an average primary particle diameter of 15 nm, and a BET specific surface area of 90 m$^2$/g.

For raw material 4, a dry powder was obtained by spray drying yttria ($Y_2O_3$) after wet pulverization in water. Raw material 4 had an average primary particle diameter of 200 nm, and a BET specific surface area of 6.5 m$^2$/g.

A commercially available product NanoTek $Y_2O_3$ (manufactured by CIK NanoTek Corporation) was used as raw material 5. Raw material 5 had an average primary particle diameter of 15 nm, and a BET specific surface area of 32 m$^2$/g.

Comparative Examples 7 to 9

A molded body, a pre-sintered body, and a sintered body were obtained using the same methods described above, except that a commercially available product Zpex® (manufactured by Tosoh Corporation; raw material 6) was directly used for uniaxial pressing.

Tables 1 and 2 show the measurement results for Examples and Comparative Examples. In Examples 1 to 10 and Comparative Examples 1 to 6 and 10 to 13, the yttria content was calculated to be 3.8 mol % with respect to the total mole of zirconia and stabilizer after conversion from the yttria content (mass %) shown in Table 1. In Comparative Examples 7 to 9, the yttria content was 3.1 mol % with respect to the total mole of zirconia and stabilizer.

TABLE 1

| | Mixing ratio of raw materials [mass %] | | | | | | Evaluation of particles in slurry | Evaluation of particles in powder | | |
|---|---|---|---|---|---|---|---|---|---|---|
| | Zirconia raw material | | | Yttria raw material | | Zpex | Median diameter of secondary aggregate D50 [μm] | Average particle diameter of secondary aggregate [μm] | Average particle diameter of primary particles in secondary aggregate [μm] | |
| | Raw material 1 | Raw material 2 | Raw material 3 | Raw material 4 | Raw material 5 | Raw material 6 | | | Larger particle | Smaller particle |
| Ex. 1 | 69.94 | 23.31 | 0.00 | 6.75 | 0.00 | 0.00 | 0.107 | 0.113 | 0.103 | 0.057 |
| Ex. 2 | 46.62 | 46.62 | 0.00 | 6.75 | 0.00 | 0.00 | 0.110 | 0.115 | 0.122 | 0.056 |
| Ex. 3 | 69.94 | 23.31 | 0.00 | 6.75 | 0.00 | 0.00 | 0.107 | 0.113 | 0.103 | 0.057 |
| Ex. 4 | 46.62 | 46.62 | 0.00 | 6.75 | 0.00 | 0.00 | 0.110 | 0.115 | 0.122 | 0.056 |
| Ex. 5 | 23.31 | 69.94 | 0.00 | 6.75 | 0.00 | 0.00 | 0.113 | 0.117 | 0.129 | 0.034 |
| Ex. 6 | 69.94 | 23.31 | 0.00 | 6.75 | 0.00 | 0.00 | 0.107 | 0.113 | 0.103 | 0.057 |
| Ex. 7 | 46.62 | 46.62 | 0.00 | 6.75 | 0.00 | 0.00 | 0.110 | 0.115 | 0.122 | 0.056 |
| Ex. 8 | 23.31 | 69.94 | 0.00 | 6.75 | 0.00 | 0.00 | 0.113 | 0.117 | 0.129 | 0.034 |
| Ex. 9 | 69.94 | 23.31 | 0.00 | 6.75 | 0.00 | 0.00 | 0.107 | 0.113 | 0.103 | 0.057 |
| Ex. 10 | 46.62 | 46.62 | 0.00 | 6.75 | 0.00 | 0.00 | 0.110 | 0.115 | 0.122 | 0.056 |
| Com. Ex. 1 | 0.00 | 93.25 | 0.00 | 6.75 | 0.00 | 0.00 | 0.120 | 0.148 | 0.000 | 0.016 |
| Com. Ex. 2 | 0.00 | 93.25 | 0.00 | 6.75 | 0.00 | 0.00 | 0.120 | 0.148 | 0.000 | 0.016 |
| Com. Ex. 3 | 0.00 | 93.25 | 0.00 | 6.75 | 0.00 | 0.00 | 0.120 | 0.148 | 0.000 | 0.016 |
| Ex. 11 | 69.94 | 0.00 | 23.31 | 6.75 | 0.00 | 0.00 | 0.141 | 0.161 | 0.106 | 0.032 |
| Ex. 12 | 69.94 | 0.00 | 23.31 | 6.75 | 0.00 | 0.00 | 0.141 | 0.161 | 0.106 | 0.032 |
| Ex. 13 | 69.94 | 23.31 | 0.00 | 0.00 | 6.75 | 0.00 | 0.112 | 0.115 | 0.104 | 0.027 |
| Ex. 14 | 46.62 | 46.62 | 0.00 | 0.00 | 6.75 | 0.00 | 0.121 | 0.124 | 0.121 | 0.037 |
| Ex. 15 | 23.31 | 69.94 | 0.00 | 0.00 | 6.75 | 0.00 | 0.141 | 0.235 | 0.128 | 0.016 |
| Ex. 16 | 69.94 | 23.31 | 0.00 | 0.00 | 6.75 | 0.00 | 0.112 | 0.115 | 0.104 | 0.027 |
| Ex. 17 | 46.62 | 46.62 | 0.00 | 0.00 | 6.75 | 0.00 | 0.121 | 0.124 | 0.121 | 0.037 |
| Ex. 18 | 23.31 | 69.94 | 0.00 | 0.00 | 6.75 | 0.00 | 0.141 | 0.235 | 0.128 | 0.016 |
| Com. Ex. 4 | 0.00 | 0.00 | 93.25 | 6.75 | 0.00 | 0.00 | 0.495 | 0.930 | 0.000 | 0.010 |
| Com. Ex. 5 | 0.00 | 0.00 | 93.25 | 6.75 | 0.00 | 0.00 | 0.495 | 0.930 | 0.000 | 0.010 |
| Com. Ex. 6 | 0.00 | 0.00 | 93.25 | 6.75 | 0.00 | 0.00 | 0.495 | 0.930 | 0.000 | 0.010 |
| Com. Ex. 7 | 0.00 | 0.00 | 0.00 | 0.00 | 0.00 | 100 | — | 0.400 | 0.000 | 0.040 |
| Com. Ex. 8 | 0.00 | 0.00 | 0.00 | 0.00 | 0.00 | 100 | — | 0.400 | 0.000 | 0.040 |
| Com. Ex. 9 | 0.00 | 0.00 | 0.00 | 0.00 | 0.00 | 100 | — | 0.400 | 0.000 | 0.040 |
| Com. Ex. 10 | 93.25 | 0.00 | 0.00 | 6.75 | 0.00 | 0.00 | 0.102 | 0.108 | 0.104 | 0.000 |
| Com. Ex. 11 | 93.25 | 0.00 | 0.00 | 6.75 | 0.00 | 0.00 | 0.102 | 0.108 | 0.104 | 0.000 |
| Com. Ex. 12 | 93.25 | 0.00 | 0.00 | 6.75 | 0.00 | 0.00 | 0.800 | 0.810 | 0.400 | 0.080 |
| Com. Ex. 13 | 69.94 | 23.31 | 0.00 | 6.75 | 0.00 | 0.00 | 0.400 | 0.420 | 0.125 | 0.016 |

TABLE 2

| | Evaluation of molded body | Evaluation of pre-sintered body | | | | | | |
|---|---|---|---|---|---|---|---|---|
| | | Average particle diameter of secondary aggregate [μm] | Average particle diameter of primary particles in secondary aggregate [μm] | | Content of primary particles in secondary aggregate [volume %] | | | |
| | Shape retainability | | Larger particle | Smaller particle | Larger particle | Smaller particle | Density [g/cm$^3$] | Presence or absence of stabilizer |
| Ex. 1 | Good | 0.113 | 0.110 | 0.050 | 75 | 25 | 3.25 | Present |
| Ex. 2 | Good | 0.117 | 0.119 | 0.049 | 50 | 50 | 3.18 | Present |
| Ex. 3 | Good | 0.113 | 0.110 | 0.050 | 75 | 25 | 3.25 | Present |
| Ex. 4 | Good | 0.117 | 0.119 | 0.049 | 50 | 50 | 3.18 | Present |
| Ex. 5 | Good | 0.120 | 0.123 | 0.035 | 25 | 75 | 3.06 | Present |
| Ex. 6 | Good | 0.113 | 0.110 | 0.050 | 75 | 25 | 3.25 | Present |
| Ex. 7 | Good | 0.117 | 0.119 | 0.049 | 50 | 50 | 3.18 | Present |
| Ex. 8 | Good | 0.120 | 0.123 | 0.035 | 25 | 75 | 3.06 | Present |
| Ex. 9 | Good | 0.113 | 0.110 | 0.050 | 75 | 25 | 3.25 | Present |
| Ex. 10 | Good | 0.117 | 0.119 | 0.049 | 50 | 50 | 3.18 | Present |
| Com. Ex. 1 | Good | 0.141 | 0.000 | 0.015 | 0 | 100 | 2.93 | Present |
| Com. Ex. 2 | Good | 0.141 | 0.000 | 0.015 | 0 | 100 | 2.93 | Present |
| Com. Ex. 3 | Good | 0.141 | 0.000 | 0.015 | 0 | 100 | 2.93 | Present |

TABLE 2-continued

| | | | | | | | | |
|---|---|---|---|---|---|---|---|---|
| Ex. 11 | Good | 0.164 | 0.110 | 0.032 | 75 | 25 | 2.95 | Present |
| Ex. 12 | Good | 0.164 | 0.110 | 0.032 | 75 | 25 | 2.95 | Present |
| Ex. 13 | Good | 0.117 | 0.112 | 0.038 | 75 | 25 | 3.06 | Present |
| Ex. 14 | Good | 0.128 | 0.126 | 0.025 | 50 | 50 | 3.18 | Present |
| Ex. 15 | Good | 0.237 | 0.131 | 0.026 | 25 | 75 | 3.26 | Present |
| Ex. 16 | Good | 0.117 | 0.112 | 0.038 | 75 | 25 | 3.06 | Present |
| Ex. 17 | Good | 0.128 | 0.126 | 0.025 | 50 | 50 | 3.18 | Present |
| Ex. 18 | Good | 0.237 | 0.131 | 0.026 | 25 | 75 | 3.26 | Present |
| Com. Ex. 4 | Poor | 0.936 | 0.000 | 0.010 | 0 | 100 | 2.43 | Present |
| Com. Ex. 5 | Poor | 0.936 | 0.000 | 0.010 | 0 | 100 | 2.43 | Present |
| Com. Ex. 6 | Poor | 0.936 | 0.000 | 0.010 | 0 | 100 | 2.43 | Present |
| Com. Ex. 7 | Poor | 0.400 | 0.000 | 0.040 | 0 | 100 | 2.71 | Absent |
| Com. Ex. 8 | Poor | 0.400 | 0.000 | 0.040 | 0 | 100 | 2.71 | Absent |
| Com. Ex. 9 | Poor | 0.400 | 0.000 | 0.040 | 0 | 100 | 2.71 | Absent |
| Com. Ex. 10 | Good | 0.112 | 0.112 | 0.000 | 100 | 0 | 3.12 | Present |
| Com. Ex. 11 | Good | 0.112 | 0.112 | 0.000 | 100 | 0 | 3.12 | Present |
| Com. Ex. 12 | Good | 0.822 | 0.415 | 0.08 | 100 | 1 | 2.35 | Present |
| Com. Ex. 13 | Poor | 0.422 | 0.131 | 0.016 | 88 | 12 | 2.63 | Present |

| | Evaluation of sintered body | | | | | | | |
|---|---|---|---|---|---|---|---|---|
| | Firing temperature | Average crystal grain size | Density [g/cm$^3$] | | Translucency ΔL * (W-B) | | Biaxial flexural strength [MPa] | |
| | [° C.] | [μm] | Value | Determination | Value | Determination | Value | Determination |
| Ex. 1 | 1500 | 0.580 | 6.08 | Good | 12.5 | Good | 964 | Good |
| Ex. 2 | 1500 | 0.620 | 6.03 | Good | 11.9 | Good | 861 | Good |
| Ex. 3 | 1450 | 0.550 | 5.99 | Good | 10.7 | Moderate | 1061 | Good |
| Ex. 4 | 1450 | 0.560 | 6.00 | Good | 10.4 | Moderate | 877 | Good |
| Ex. 5 | 1450 | 0.580 | 5.95 | Good | 12.1 | Good | 966 | Good |
| Ex. 6 | 1400 | 0.470 | 6.04 | Good | 9.9 | Moderate | 1016 | Good |
| Ex. 7 | 1400 | 0.490 | 6.03 | Good | 9.8 | Moderate | 870 | Good |
| Ex. 8 | 1400 | 0.500 | 5.97 | Good | 11.4 | Good | 1035 | Good |
| Ex. 9 | 1350 | 0.440 | 5.95 | Good | 8.6 | Moderate | 1022 | Good |
| Ex. 10 | 1350 | 0.450 | 5.90 | Good | 9.3 | Moderate | 918 | Good |
| Com. Ex. 1 | 1500 | 0.880 | 5.99 | Good | 12.5 | Good | 736 | Poor |
| Com. Ex. 2 | 1450 | 0.610 | 5.91 | Good | 12.2 | Good | 709 | Poor |
| Com. Ex. 3 | 1400 | 0.550 | 5.87 | Good | 11.8 | Good | 676 | Poor |
| Ex. 11 | 1500 | 0.500 | 6.05 | Good | 12.1 | Good | 1011 | Good |
| Ex. 12 | 1450 | 0.510 | 5.95 | Good | 11.0 | Good | 1050 | Good |
| Ex. 13 | 1450 | 0.550 | 6.06 | Good | 11.5 | Good | 1091 | Good |
| Ex. 14 | 1450 | 0.560 | 5.82 | Good | 12.3 | Good | 970 | Good |
| Ex. 15 | 1450 | 0.450 | 5.93 | Good | 10.0 | Moderate | 1125 | Good |
| Ex. 16 | 1400 | 0.500 | 5.96 | Good | 11.4 | Good | 1123 | Good |
| Ex. 17 | 1400 | 0.480 | 6.02 | Good | 10.3 | Moderate | 1011 | Good |
| Ex. 18 | 1400 | 0.360 | 5.97 | Good | 8.8 | Moderate | 1318 | Good |
| Com. Ex. 4 | 1500 | 0.560 | 5.89 | Good | 6.8 | Poor | 832 | Poor |
| Com. Ex. 5 | 1450 | 0.330 | 5.86 | Good | 5.1 | Poor | 816 | Poor |
| Com. Ex. 6 | 1400 | 0.350 | 5.66 | Poor | 2.6 | Poor | — | — |
| Com. Ex. 7 | 1500 | 0.660 | 5.88 | Good | 16.0 | Good | 543 | Poor |
| Com. Ex. 8 | 1450 | 0.600 | 5.85 | Good | 15.4 | Good | 593 | Poor |
| Com. Ex. 9 | 1450 | 0.590 | 5.79 | Poor | 15.1 | Good | 695 | Poor |
| Com. Ex. 10 | 1450 | 0.620 | 5.88 | Good | 8.1 | Poor | 951 | Good |
| Com. Ex. 11 | 1400 | 0.550 | 5.76 | Poor | 7.5 | Poor | 705 | Poor |
| Com. Ex. 12 | 1500 | 0.520 | 5.85 | Good | 8.4 | Poor | 961 | Good |
| Com. Ex. 13 | 1500 | 0.470 | 5.84 | Good | 7.8 | Poor | 988 | Good |

As shown in Table 2, the sintered bodies had low strength in Comparative Examples 1 to 3 and 7 to 9 in which only the smaller particles were contained with no larger particles. The sintered bodies had low translucency in Comparative Examples 4 to 6 in which the secondary aggregates had large average particle diameters. It was not possible to satisfy both high strength and high translucency in these comparative examples. The sintered bodies of Comparative Examples 10 to 13 had low translucency, and the strength was also low in Comparative Example 11. It was not possible to satisfy both high strength and high translucency in these comparative examples. In contrast, the sintered bodies of Examples 1 to 18 had a translucency of 8.0 or more, and a biaxial flexural strength of 800 MPa or more, satisfying high strength and high translucency at the same time.

The invention claimed is:

1. A zirconia pre-sintered body comprising a secondary aggregate having an average particle diameter of 275 nm or less, the secondary aggregate comprising zirconia, and a stabilizer capable of preventing a phase transformation of zirconia, the secondary aggregate comprising a larger particle portion having an average primary particle diameter of 100 nm or more and 200 nm or less, and a smaller particle portion having an average primary particle diameter of 10 nm or more and less than 60 nm, and the larger particle portion comprising zirconia, the stabilizer, or both and the smaller particle portion comprising zirconia, the stabilizer, or both, wherein the content of the larger particle portion in the secondary aggregate is 15 to 85 volume %, and the content of the smaller particle portion in the secondary aggregate is 15 to 85 volume %.

2. The zirconia pre-sintered body according to claim 1, wherein the stabilizer is yttria.

3. The zirconia pre-sintered body according to claim 1, wherein the content of the stabilizer is 3.0 to 7.5 mol % with respect to the total mole of the zirconia and the stabilizer, and at least a part of the stabilizer is not dissolved in the zirconia as a solid solution.

4. The zirconia pre-sintered body according to claim 1, which has a density of 2.75 g/cm$^3$ or more.

5. The zirconia pre-sintered body according to claim 1, wherein a sintered body after the pre-sintered body is fired at a firing temperature of 1,500° C. or less for 2 hours contains crystal grains with an average crystal grain size of 0.70 μm or less.

6. The zirconia pre-sintered body according to claim 1, wherein a sintered body after the pre-sintered body is fired at a firing temperature of 1,500° C. or less for 2 hours has a density of 5.8 g/cm$^3$ or more.

7. The zirconia pre-sintered body according to claim 1, which has two peaks in a number-based particle size distribution measured with an electron microscope image of the larger particle portion and the smaller particle portion, with a first peak representing a most frequent particle diameter occurring at a particle size of 10 nm or more and less than 60 nm, and a second peak occurring at a particle size of 60 nm or more and 200 nm or less.

8. A method for producing a zirconia pre-sintered body that comprises zirconia, and a stabilizer capable of preventing a phase transformation of zirconia, comprising sintering a composition which comprises a powder (A) that comprises a secondary aggregate comprising a powder (a1) having an average primary particle diameter of 100 nm or more and 200 nm or less, and a powder (a2) having an average primary particle diameter of 10 nm or more and less than 60 nm, the secondary aggregate having an average particle diameter of 275 nm or less, the secondary aggregate comprising zirconia, and a stabilizer capable of preventing a phase transformation of zirconia, wherein the powder (A) comprising the secondary aggregate comprises:

15 to 85 mass % of the powder (a1) having an average primary particle diameter of 100 nm or more and 200 nm or less; and 15 to 85 mass % of the powder (a2) having an average primary particle diameter of 10 nm or more and less than 60 nm.

9. The method for producing a zirconia pre-sintered body according to claim 8, wherein the powder (a1) comprises the stabilizer.

10. The method for producing a zirconia pre-sintered body according to claim 8, wherein the content of the stabilizer is 3.0 to 7.5 mol % with respect to the total mole of the zirconia and the stabilizer, and at least a part of the stabilizer is not dissolved in the zirconia as a solid solution.

11. The method for producing a zirconia pre-sintered body according to claim 8, wherein the stabilizer is yttria.

12. A method for producing a powder for obtaining a zirconia pre-sintered body of claim 1, comprising producing a slurry comprising a secondary aggregate that comprises a powder (a1) having an average primary particle diameter of 100 to 275 nm, and a powder (a2) having an average primary particle diameter of 10 nm or more and less than 60 nm, and that has an average particle diameter of 275 nm or less; and granulating the slurry by dry spraying.

13. A method for producing a zirconia sintered body, comprising firing a zirconia pre-sintered body of claim 1.

* * * * *